United States Patent [19]

Gibson et al.

[11] 4,301,888
[45] Nov. 24, 1981

[54] BI-DIRECTIONAL IMPULSE SHEAR WAVE GENERATOR AND METHOD OF USE

[75] Inventors: James B. Gibson, Placentia; Daryl R. Boomer, Yorba Linda, both of Calif.; Henry Schoellhorn, III, Rumbai, Indonesia

[73] Assignee: Chevron Research Company, San Francisco, Calif.

[21] Appl. No.: 85,566

[22] Filed: Oct. 17, 1979

[51] Int. Cl.³ .................... G01V 1/053; G01V 1/155
[52] U.S. Cl. .................................. 181/114; 181/121; 181/401
[58] Field of Search ............... 181/113, 114, 121, 401; 367/75

[56] References Cited

U.S. PATENT DOCUMENTS

| | | | |
|---|---|---|---|
| 2,740,488 | 4/1956 | Heaps | 367/75 |
| 2,910,134 | 10/1959 | Crawford et al. | 181/121 |
| 3,270,832 | 9/1966 | Williams | 181/401 |
| 3,716,111 | 2/1973 | Lavergne | 367/75 |
| 4,064,964 | 12/1977 | Norden | 181/121 |
| 4,118,994 | 10/1978 | Layotte et al. | 367/75 |
| 4,205,731 | 6/1980 | Chalet et al. | 181/121 |

*Primary Examiner*—Howard A. Birmiel
*Attorney, Agent, or Firm*—J. A. Buchanan, Jr.; R. L. Freeland, Jr.; H. D. Messner

[57] ABSTRACT

In accordance with the present invention, an impulse generator of high portability is provided using a pair of guillotinized, separately activated hammer/anvil sub-assemblies. Since each sub-assembly is horizontal positioned, say in contact with the earth from a position below the wheel of an exploration truck, the equivalent of the "flying blade" of a guillotine, i.e., a weighted hammer element, must be provided with horizontal movement. This is done by tensioning a plurality of springs attached between the hammer element and a rectangular main frame.

During cocking and release of the hammer, the explorationist is provided with a series of visual signals in the form of deactivated and activated panel lights. These signals are automatically provided by controller means of the present invention. Release of the cocked hammer, however, is operator controlled for safety reasons say by activation of a latching means attached to the main frame of the assembly.

11 Claims, 9 Drawing Figures

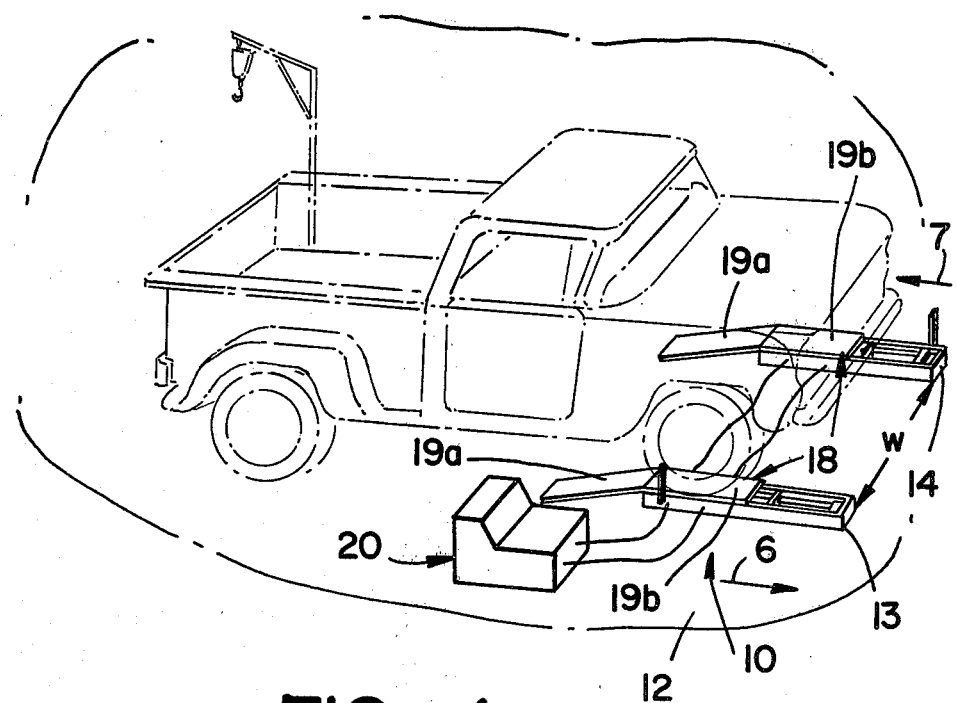
FIG_1
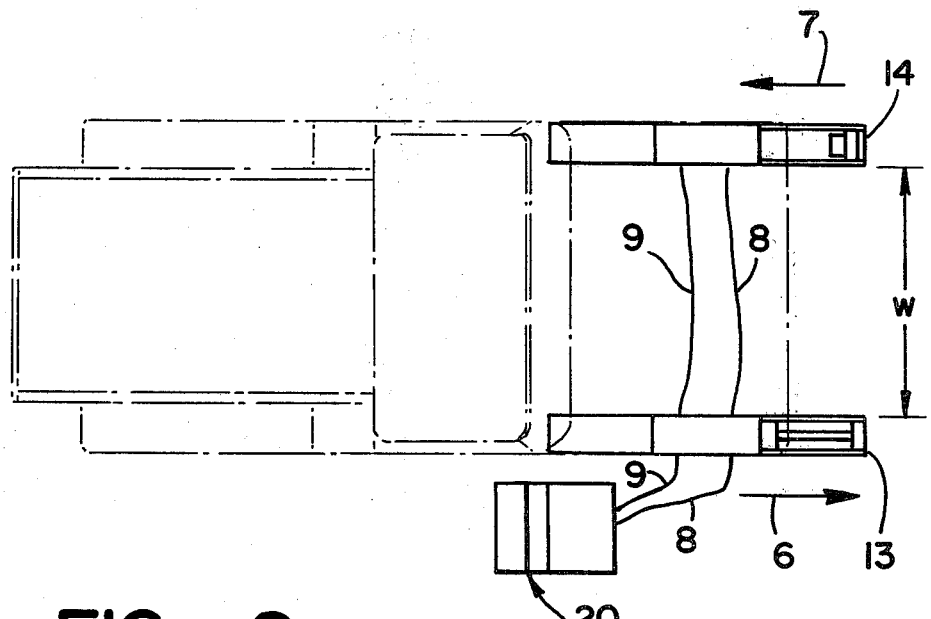
FIG_2

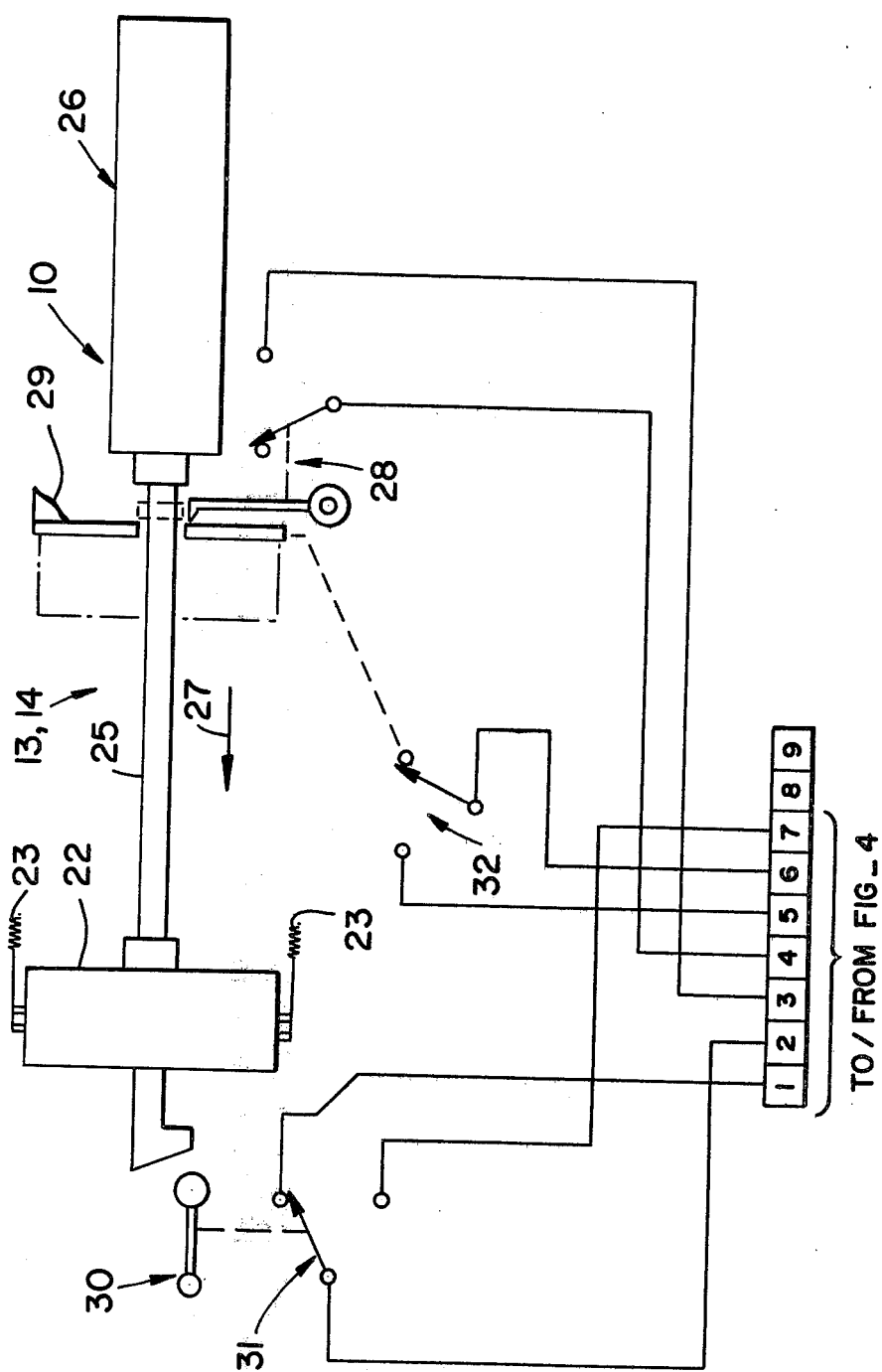
FIG_3

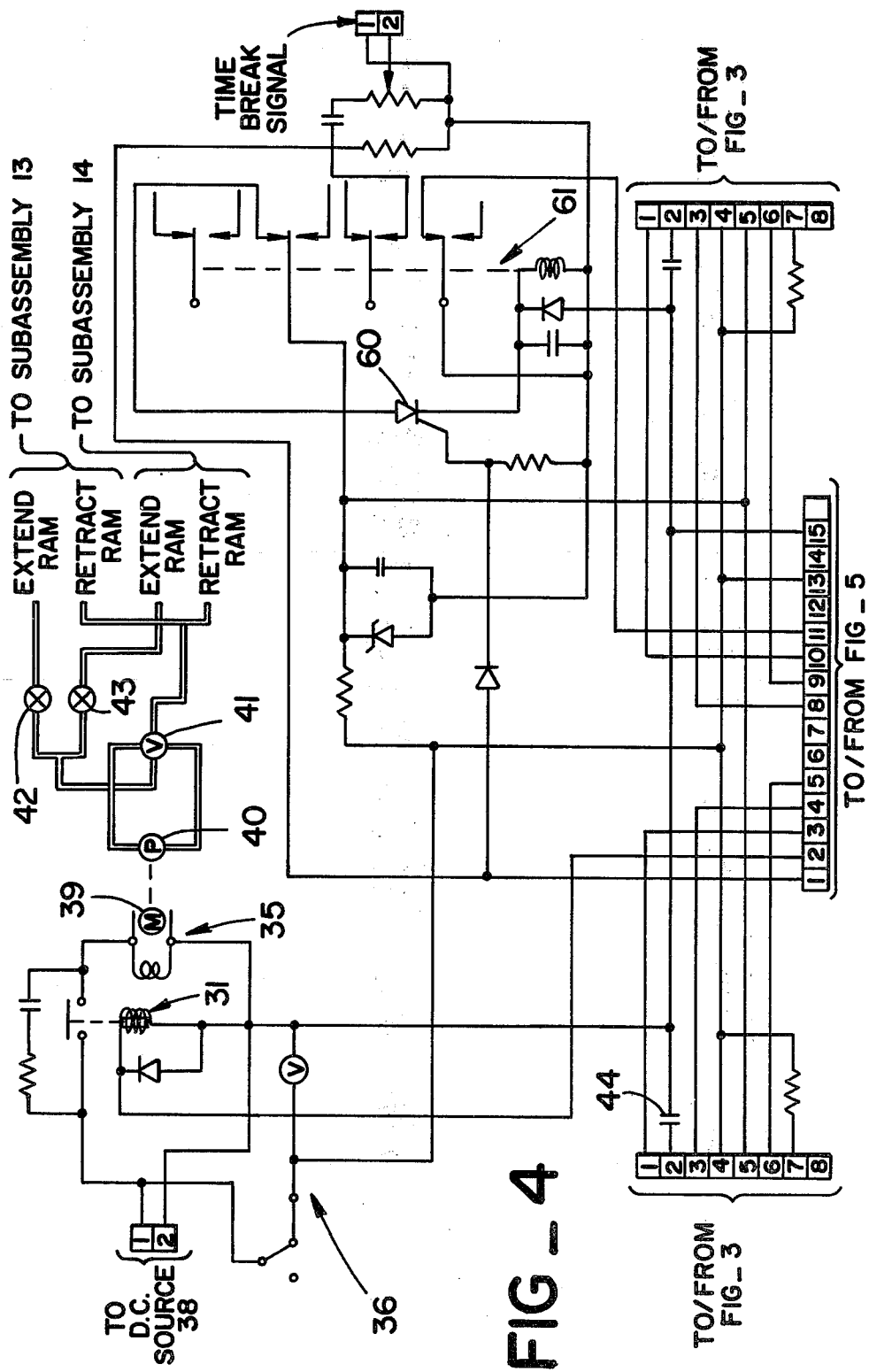

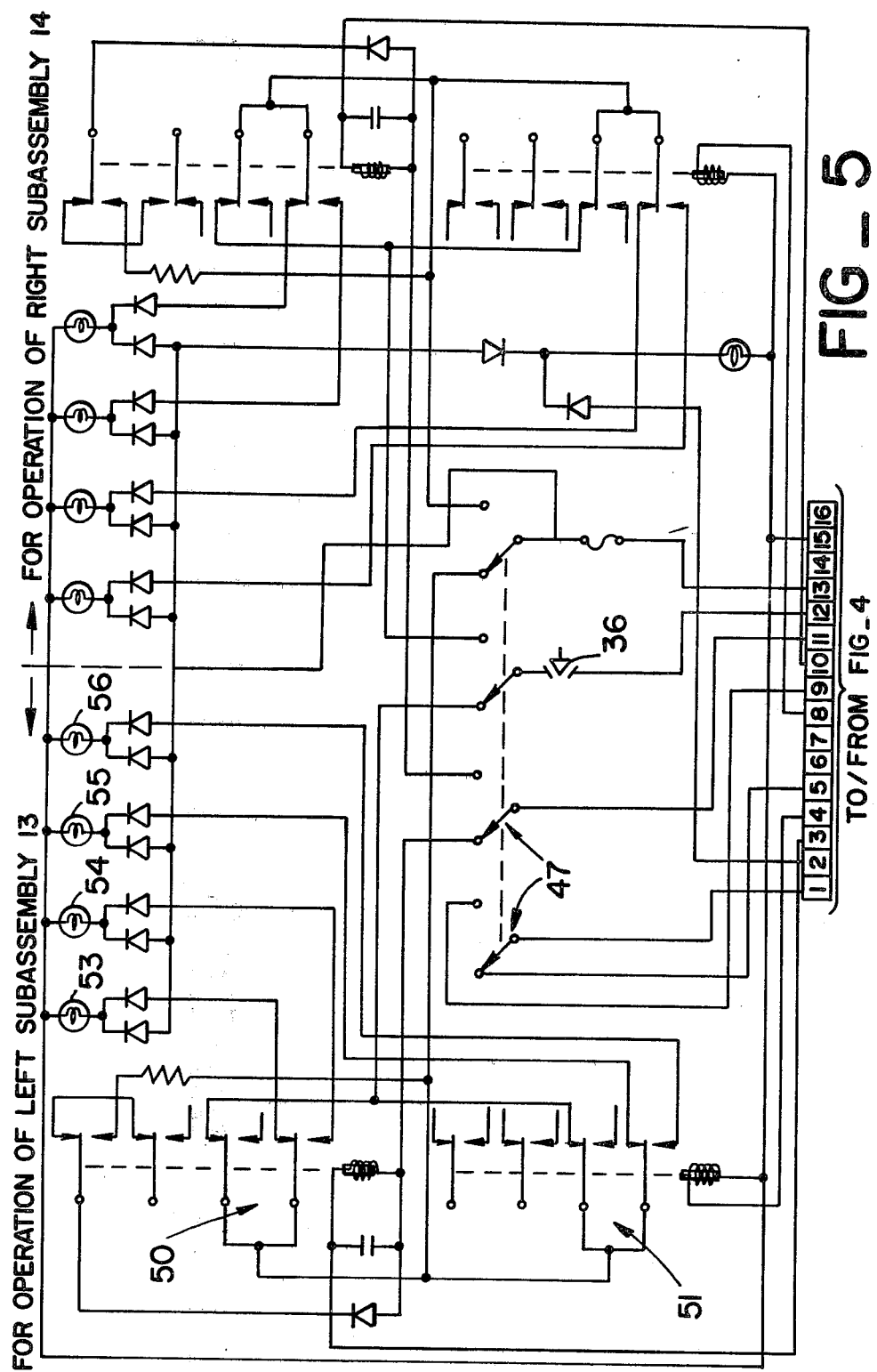
FIG_5

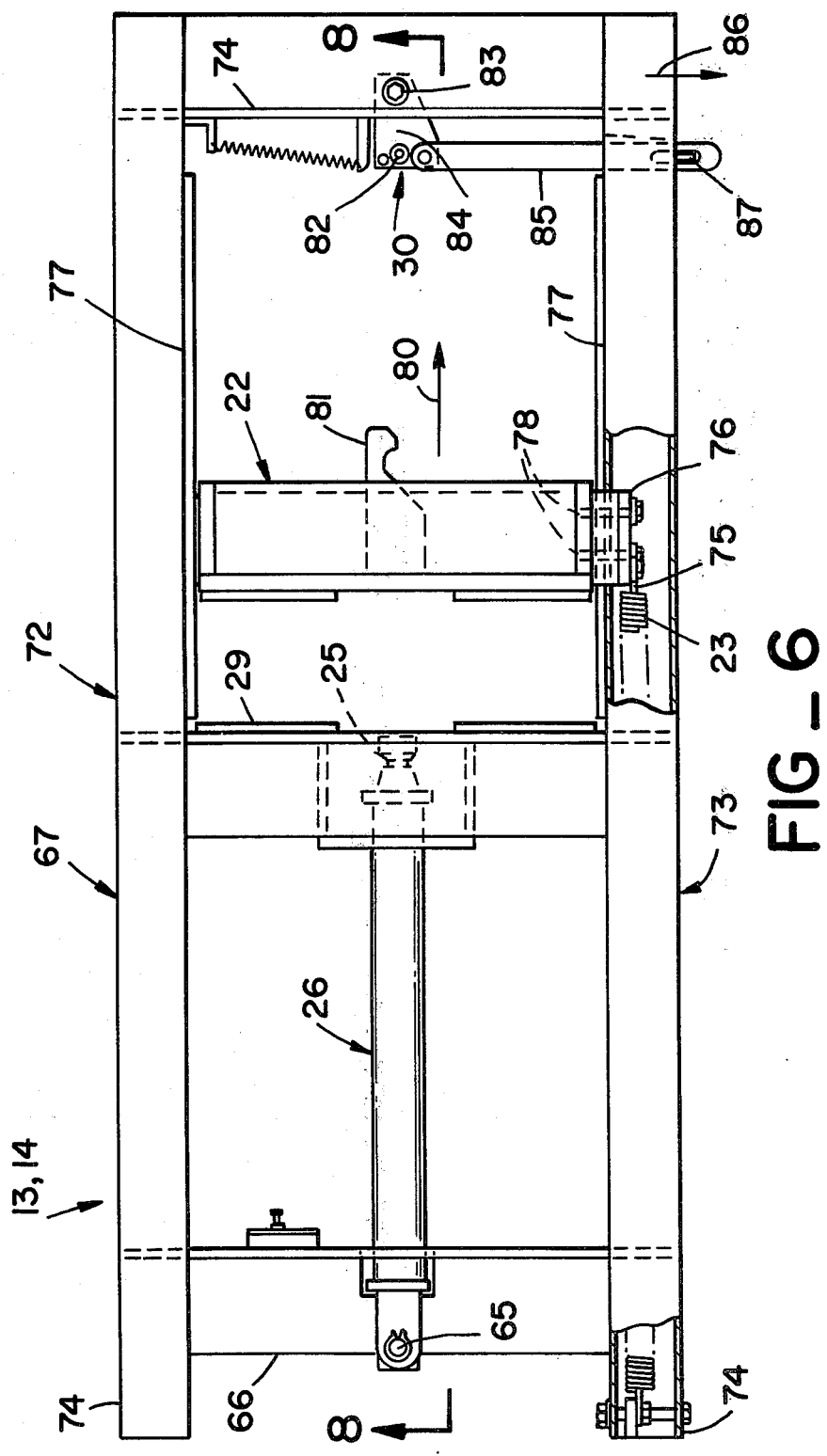

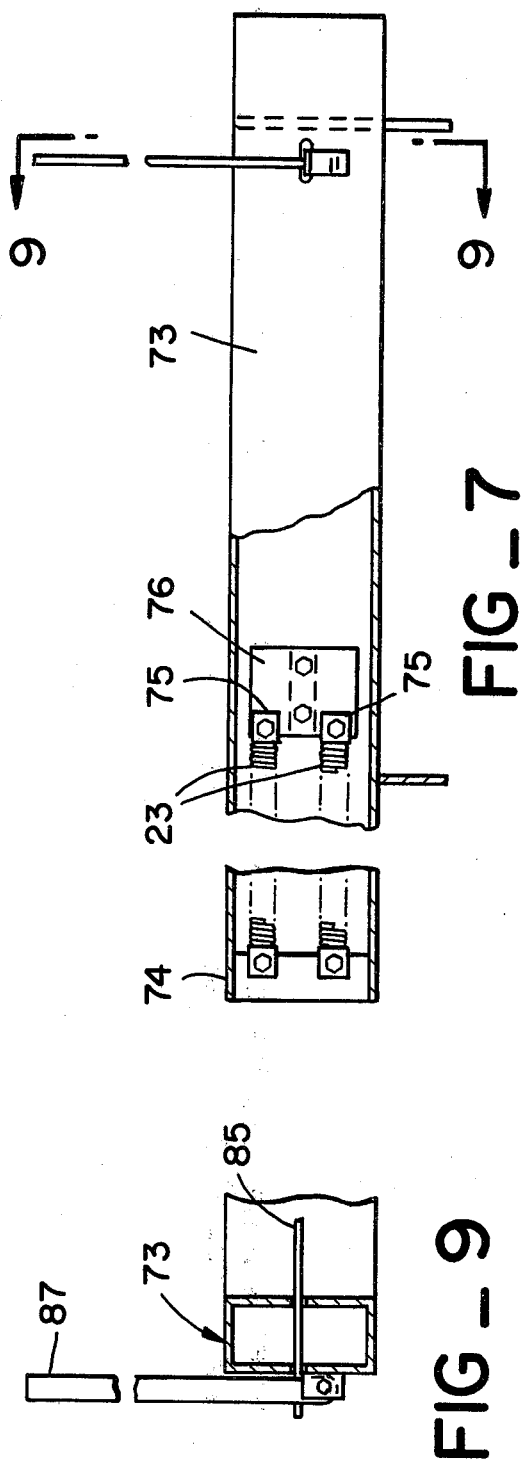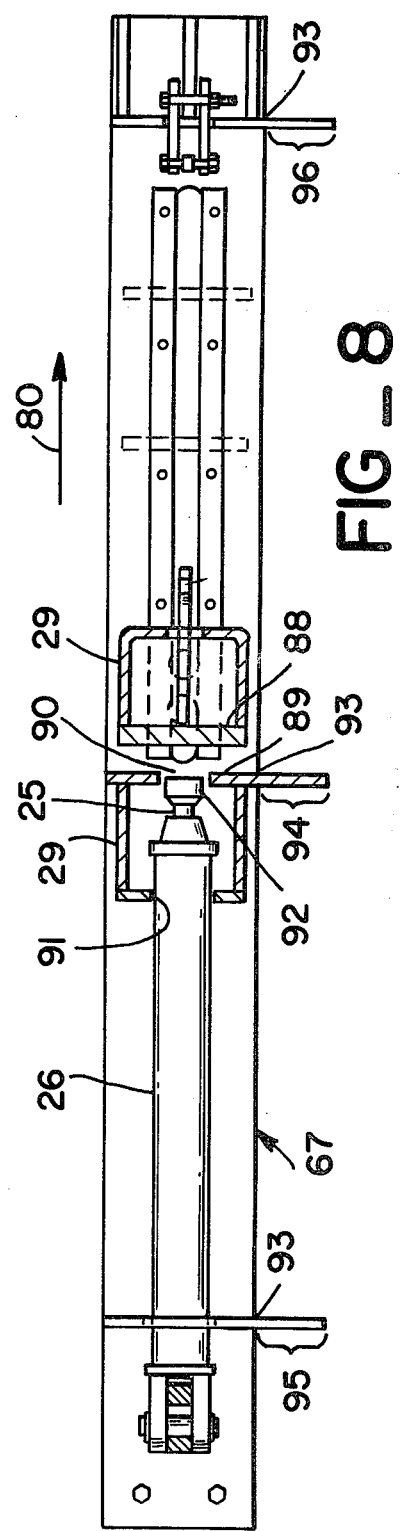

BI-DIRECTIONAL IMPULSE SHEAR WAVE GENERATOR AND METHOD OF USE

SCOPE OF THE INVENTION

This invention relates to an impulse generator for the purpose of providing shear wave energy for use in the exploration of minerals, hydrocarbons and the like, and more particularly to a single and inexpensive portable impulse generator for producing discontinuous shear wave energy for use in shallow reflection/refraction surface exploration activities or in vertical velocity determinations associated with shallow bore holes.

Note that in the generation of shear wave energy for exploration purposes, the particle motion of the wave is at right angles to its direction of propagation, see page 20, "Introduction to Geophysical Prospecting", M. D. Dobrin, McGraw-Hill (1960).

BACKGROUND OF THE INVENTION

While service companies have provided men, materials and money for development of continuous shear wave generators, there has been a paucity of similar efforts with regard to impulse shear wave generators. Furthermore, experience now shows that exploration situations do exist where a small portable shear wave generator could be quite useful, for example, for shallow bore hole velocity surveys or for shallow reflection/refraction activities involving small survey parties.

Available impulse generators of which were are aware involve a wide spectrum of equipment to provide shear wave energy, for use of shaped explosive dynamite charges and the like in selective field layouts, to use of large hammer-anvil apparatus in which a large rotational rim is positioned on a cable and is hurled through a wide arc to strike an anvil attached to the earth's surface.

SUMMARY OF THE PRESENT INVENTION

In accordance with the present invention, an impulse generator of high portability is provided using a pair of guillotinized, separately activated hammer/anvil sub-assemblies.

Since each sub-assembly is horizontally positioned, in contact with the earth from a position below the wheel of an exploration truck, the equivalent of the "flying blade" of a guillotine, i.e., a weighted hammer element, must be provided for horizontal movement. This is done by tensioning a plurality of springs attached between the hammer element and a rectangular main frame. Each rectangular main frame in plan view, if shaped like the number "8" in block form, with the spring loadable hammer being slidable within the main housing. Each sub-assembly also includes controller means operationally connected so as to tension the aforementioned springs by a hydraulically activated jack. Result: the hammer can be easily pushed from its rest position adjacent an anvil element (which also forms the mid member of the main frame) to a cocked position adjacent an end member of the same main frame. After release of the cocked hammer element via a latching mechanism, the hammer ultimately impinges upon the anvil to provide shear wave energy in the direction of the hammer. Since the main frame has an axis of symmetry which is parallel to the earth's surface, the direction of propagation of the shear wave energy is approximately parallel to the earth's surface. The main frame also includes a ramp and support cover so that the wheels of the truck can be positioned atop each sub-assembly to better couple the energy between the main frame and the earth.

During cocking and release of the hammer, the explorationist is provided with a series of visual signals in the form of deactivated and activated panel lights. These signals are automatically provided by the controller means of the present invention. Release of the cocked hammer, however, is operator controlled for safety reasons say by activation of the latching means attached to the main frame of the assembly.

DESCRIPTION OF THE DRAWINGS

FIG. 1 is a side elevation of the impulse generator of the invention in which front wheels of an exploration truck are positioned atop a pair of guillotinized sub-assemblies;

FIG. 2 is a top elevational view of FIG. 1 in which the truck is shown in phantom line but in which details of the guillotinized, anvil/hammer sub-assemblies are further illustrated, particularly to their construction and operation;

FIG. 3 illustrates, in further detail, operations of the sub-assemblies of FIG. 2;

FIGS. 4 and 5 illustrate controller means useful for controlling operations of the guillotinized anvil/hammer sub-assembly of FIG. 3;

FIG. 6 is a top elevational view, partially cut away of one of the sub-assemblies of FIG. 2;

FIG. 7 is a side elevation of one of the sub-assemblies of FIG. 2; and

FIGS. 8 and 9 are sections taken along lines of 8—8 and 9—9, respectively of FIGS. 6 and 7;

DESCRIPTION OF EMBODIMENTS OF THE INVENTION

FIG. 1 illustrates a field environment in which shear wave generator 10 is used to provide shear wave energy for exploration purposes. As generator 10 is activated, shear wave energy is generated at the earth's surface 12. Reflective and/or refractive portions of that energy are received at a series of geophones (not shown) remote from the generation site.

In order to provide bi-directional shear wave energy, the shear wave generator 10 of the present invention includes separately activated, guillotinized anvil/hammer sub-assemblies 13 and 14. Firm anchoring of the generator 10 to the earth's surface 12 is enhanced by positioning the partial weight of an equipment truck 15 atop the generator 10 say via front wheels 16 and 17 atop sub-assemblies 13 and 14, respectively. In positioning the wheels 16 and 17 atop the generator 10, the sub-assemblies 13 and 14 are first placed at the earth's surface 12 a lateral distance W apart. Each is then fitted with a hinge cover plate 18 including a ramp section 19a connected to a support section 19b. After the truck 15 is driven forward to the position shown in FIG. 1, all wheels remain in an unbraked conditions, i.e., "free wheeling". Result: small rectilinear movements of the generator 10 with respect to earth's surface 12, can be followed by truck 15.

The direction of propagation of the generated shear wave energy provided by the pairs of sub-assemblies 13 and 14 is of course coextensive along a plane through the equipment truck, but in opposite directions. But the actual time frame of activation of the sub-assemblies 13, 14 does not overlap. That is to say, sub-assembly 13 is energized to pass energy in the direction of arrow 6 before sub-assembly 14 is energized to pass energy in the direction of arrow 7.

Since operations are to be performed by minimum number of persons, operations are necessarily automated through operations of a controller circuit 20 located adjacent to the sub-assemblies 13 and 14 as shown in detail in FIG. 2. As explained in more detail below, the controller 20 is used to sequentially place each sub-assembly 13 or 14 in an activated states say by increasing pressure of fluid within hydraulic lines 8 connected to the sub-assemblies. As also noted, electrical lines 9 also interconnect the generator elements to aid operations as explained below.

FIG. 3 illustrates operation of the shear wave generator 10 in still more detail.

Since each sub-assembly 13, 14 of the generator 10 is horizontally positioned, the equivalent of a "flying blade" of a guillotine, i.e., weighted hammer element 22, must be provided with horizontal movement. This is achieved by tensioning springs 23 attached to the element 22 followed by their release.

Assume the operator has initiated operations such that a hydraulic circuit (not shown) of controller 20 has been activated, and ram 25 of hydraulic jack 26 has provided movement of the hammer element 22 in the direction of arrow 27. Initially switch 28 of the controller 20 is open. But the switch 28 quickly closes as soon as ram 25 moves the hammer element from its relaxed position adjacent to anvil element 29. Such condition is indicated to the operator via visual signals displayed on a display board of the controller 20 as explained below. During the final approach of the hammer element to a latching mechanism 30 switch 31 of the controller 20 undergoes a change in condition say from open to close then open conditions (due to mechanical change in position of the latching mechanism 30 as it first climbs the inclined forward surface of the hammer element 22 and then drops into the recess formed behind that surface). The jack is retracted to clear the travel area. Conditions are indicated to the operator via visual displays at his display board.

Although the operator is automatically provided with status signals, during cocking of the hammer element 22, subsequent release of the hammer element 22 is not an automated function of the controller 20. In fact, the operator must hand release the latter by releasing the latching mechanism 30. This is primarily to satisfy safety regulations. After the operator has deactivated the mechanism 30, the hammer 22 impinges upon the anvil element 20 such condition also being visually indicated on the display board of the controller 20, using a change in state of which switch 32 for that purpose. Switch 32 specifically changes from an open to a close condition during the impingement process.

FIGS. 4 and 5 illustrate operation of the controller 20 in still more detail.

Briefly FIG. 4 relates most particularly to operations of hydraulic circuit elements of the controller 20. On the other hand, FIG. 5 illustrates in some detail generation of status signals via switching relays which can but not necessarily interconnect with the hydraulic circuit of FIG. 4. Also while the signals provided by change in status switches 28, 31 and 32 of FIG. 3 are automatically generated during the course of cocking and releasing the hammer element 22, it should be pointed out that other signals must necessarily be operator initiated using switching arrays in the manner set forth below.

FIG. 4 illustrates hydraulic circuit 35 in more detail.

As shown, operations are initiated by the operator closing switch 36. Closure of switch 36 allows relay 37 to change state so that current from source 38 can drive motor 39 of pump 40. Pressure increases occur at the hydraulic jack 26 of FIG. 3 via proper opening of valves 41 and 42, causing elongation of the jack ram as previously explained. Valve 43 is closed during the process so long as valve 42 is open and vice versa. After the hammer element is locked in a cocked position, the operation of pump 40 is terminated by opening relay 31 through operative to change in the charging/discharging status of switching capacitor 44.

It should be noted that a change in position a four-way valve 41 is used to release pressure at the hydraulic ram. Result: the ram retracts to a relaxed position in the manner set forth in FIG. 3. Thereafter the cocked hammer can be released and operations repeated using the other half of the generator 10, i.e., using sub-assembly 14 after terminating the operation of sub-assembly 13, for example.

FIG. 5 illustrates switching operations of controller 20 in still more detail.

After operations of the one of the sub-assemblies 13 or 14 has been terminated, the operator actuates the remaining sub-assembly via rotation of gang switching array 47 to a new position. Result: operations can be easily repeated using the remaining sub-assembly via actuation of the hydraulic circuit 35 of FIG. 4 in similar manner as previously explained.

Of some importance in the switching operation of controller 20 of FIG. 5 is the operation of the relays 50 and 51 controlling—in an intermittent fashion—panel lights 53, 54, 55 and 56. Such operations are determined, of course, by operating status switches 28, 31 and 32 of FIG. 2. Such signals provide the operator with indications of what is actually happening within the operative sequence of each subassembly 13 or 14.

In this regard, Table I set forth below illustrates the sequence of activation of the panel lights 53, 54, 55 and 56, relays 50 and 51 in association with the switches 28, 30 and 31 of FIG. 3. Note particularly that at no time are more than two lights of the above listed number of lights activated since operations of relays 50 and 51 are for the most part complimentary.

It should be further emphasized that the switch 32 of FIG. 3 provides a particularly important selection function with respect to FIG. 4: it cooperates in operations of the switching transistor 60 and relay 61 of time break indicating circuit 62.

With respect to FIG. 4, during change in the open, close, open condition of switch 32 of FIG. 3, relay 61 enters into an active status since the time break signal causes switching transistors 60 to conduct over the time frame switch 32 is closed. However, note that the closure of the switch 32 also leads to automatic resetting of relay 50 associated with hammer element 22 via closing of relay contact 63 of the relay 61 of FIG. 4. Hence panel lights 53, 54, 55 and 56 resume a relaxed state, namely, as shown along with topmost line of Table I and operations can be repeated as set forth above.

TABLE I

| Circuit Element | | |
|---|---|---|
| | Status | Status |

TABLE I-continued

| Operational Description | Switch 31 | Switch 28 | Switch 32 | Pump Switch 36 | Ram Relay 50 | Light 53 (Hammer Unlocked) | Light 54 (Hammer Locked) |
|---|---|---|---|---|---|---|---|
| (1) Just before pump switch 36 is activated | Open; state 1 | Open | Open | Inactive | Active | Lit | No |
| (2) Pump switch 36 activated | Open; state 1 | Closed | Open | Active | Inactive | Lit | No |
| (3) Hammer 22 contacts latch 30 (1st stage) | Closed state 2 | Closed | Open | Active | Inactive | Lit | No |
| (4) Hammer 22 contacts latch 30 (2nd stage) | Open state 1 | Closed | Open | Inactive | Inactive | No | Lit |
| (5) By-pass relief valves activated | Open state 1 | Open | Open | Inactive | Active | No | Lit |
| (6) Cocked Hammer 22 is released | Open state 1 | Open | Closes then opens | Inactive | Active | Lit | No |
| Repeat Steps 1-6 | | | | | | | |

| Operational Description | Status Light 55 (Ram ext'd) | Status Light 56 (Ram retracted) | Pump Relay 37 | Capacitor 44 | Pump Light | Hammer Relay 51 | Time Break Relay | Trans 60 | Switch Array 47 |
|---|---|---|---|---|---|---|---|---|---|
| (1) Just before pump switch 36 is activated | No | Lit | Inact | Dischg | OFF | Inact | Inact | Non-cond | Left |
| (2) Pump switch 36 activated | Lit | No | Act | Dischg | ON | Inact | Inact | Non-cond | Left |
| (3) Hammer 22 contacts latch 30 (1st stage) | Lit | No | Act | Chg | ON | Inact | Inact | Non-cond | Left |
| (4) Hammer 22 contacts latch 30 (2nd stage) | Lit | No | Inact | Dischg | OFF | Act | Inact | Non-cond | Left |
| (5) By-pass relief valves activated | No | Lit | Inact | Dischg | OFF | Act | Inact | Non-cond | Left |
| (6) Cocked Hammer 22 is released | No | Lit | Inact | Dischg | OFF | Inact | Act then Inact | Con then non-cond | Left |
| Repeat Steps 1-6 | | | | | | | | | Right |

FIGS. 6, 7, 8 and 9 illustrate constructional features of the sub-assemblies 13 and 14 of the present invention.

As shown in FIG. 6, hydraulic jack 26 is attached by rear eye anchor 65 to the remote end 66 of the main frame 67. Main frame 67 in plan view is seen to resemble the number "8" in block form, having bifurcated, enclosed side rails 72, 73 interconnected by and at right angles to remote ends 61 and 74. A mid element of the main frame forms anvil element 29.

Since rail 72, 73 are rectangular in cross-section, note that first and second pairs of springs 23 can be completely housed therein. Ends of each spring pair are fixedly attached at remote end 74 of the rail 72, 73. At an opposite end 75, each pair of springs is attached via collar 74 to the hammer element 22, on opposite sides thereof, see FIG. 7.

Returning to FIG. 6, note that interwall 77 of each rail 72, 73 is slotted to slidably accommodate bolts 78 (such bolts being part of collar 76). Result: movement of the hammer element 22 and the directional barrel 80 causes the pairs of springs 23 to assume tension conditions. When hook fastener 81 at the forward side of hammer element 22 contacts upright catch 82 of latch mechanism 30, the catch 82 undergoes rotational movement about bolt 83. Since the catch 82 is attached via plate 84 to bayonet 85, the latter undergoes rectilinear movement in the direction of arrow 86. To release the hammer, release lever 87 pinned at a remote end to the rail 73, is pulled away from main frame at a right angle to the side rail 73 (see FIG. 9), forcing catch 82 from contact with the hook fastener 81. Result: the cocked hammer 22 is released.

FIG. 8 illustrates further construction features of the hammer and anvil elements 22 and 29, respectively.

As indicated, the hammer 22 is rectangular in cross-section with forward wall 88 being of substantially increased thickness to better withstand impingement upon forward wall 89 of the anvil 29.

On the other hand, anvil 29 is also rectangular in cross-section, extends across the width of main frame 67 and is provided with twin orifices 90 and 91 in its mid portion. Note that orifice 91 is larger in lateral and height dimensions than head 92 of the ram 25 so that the latter can extend therethrough without interference. That is to say, the heat 92 can penetrate the plane of the orifice 91 and contact hammer element 22. This, of course, leads to rectilinear movement of the latter vis-a-vis rails 72, 73 in the direction of arrow 80. Note that the side rails 72, 73 ar also provided with openings 93 through which segment 94 of the anvil 29 can extend. In this way the main frame 67 can be firmly coupled to the earth and better transmit impingement into shear wave motion.

(By means of a similarly executed design, coextensive segments 85, 86 of the ends 66, 74 are likewise extendible into contact with the earth for the same purpose.)

It should be understood that the invention is not limited to any specific embodiments set forth herein as variations are readily apparent to those skilled in the art. For example, the latching mechanism 30 can be a controllable electromagnetic circuit in which a solenoid is used in the latching and releasing of the hammer element 22, under close supervision of the operator. Accordingly, the invention is to be given as broad as possible interpretation within the terms of the following claims.

We claim:

1. Method of positioning and generating shear wave energy for use in connection with a seismic exploration system, comprising:
    (a) positioning wheels of a vehicle atop first and second guillotinized sub-assemblies of a shear wave generator, to couple the generator to the earth's surface;
    (b) hydraulically causing travel of spring-biasable hammer elements of said sub-assemblies in first and second monitorable directions, said directions being opposite to each other;
    (c) after monitoring the releasably securing of said spring-biased hammer elements relative to said frame by common controller means, sequentially releasing said hammer elements relative to said frame so that said hammer elements are sequentially carried in directions opposite to said spring-biasing directions and to each other, until impinging contact with anvil elements carried on said main frame occurs, whereby bi-directional shear wave energy is sequentially caused to propagate into said earth.

2. An impulse generator positioned at the earth's surface for generating bi-directional shear wave energy for use in association with a seismic exploration system, comprising:
    (a) first and second guillotinized sub-assemblies each including a horizontally disposed main frame means in coupling contact with the earth, and carrying thereon a two-directionally traveling, spring biased hammer element and a fixed position anvil element;
    (b) controller means including separate hydraulic and electrical signal circuit means, operationally connected in common to said hammer element of each sub-assembly in discrete, signal monitorable sequences, in at least one substantially horizontal direction, full two-way travel of said hammer element of each sub-assembly being in complementary directions as to that of said hammer element of the other sub-assembly during subsequent operation thereof, so that bi-directional shear wave energy can be controllably generated, at the earth's surface for propagation substantially parallel thereto but in opposite directions, said electrical signal circuit means including first and second series of visual indicators activated by relative movement of said hammer elements of said sub-assemblies whereby both status of energy generation and improved safety of operations can be provided.

3. The generator of claim 2 in which each sub-assembly of (A) includes a latching means to be deactivated by a human operator, connected to said frame means, for releasable securing of said hammer element of each sub-assembly relative to said main frame, at least after said controller means has caused said hammer element of each sub-assembly to undergo linear travel in said one direction.

4. The generator of claim 3 in which (A) also includes a plurality of spring means carried on said frame means of each sub-assembly, and having remote ends connected to said hammer element.

5. The generator of claim 4 in which said spring means of each sub-assembly of (A) is biased by travel of said hammer element of each sub-assembly in said one direction, but upon activation of said latching means thereby releasing said tensioned hammer element from said main frame means, said hammer element is provided with rapid movement in an opposite direction, terminating in impingement upon said anvil element.

6. The generator of claim 2 in which said main frame means of each sub-assembly of (A) includes first and second spaced apart slotted side rails, and laterally extending end support members, each having ends connected to said side rails and bottom segments connected to said earth, whereby shear wave energy can be coupled from said frame means to the earth in a propagation direction parallel substantially to the earth's surface.

7. The generator of claim 6 in which said rails of each sub-assembly of (A) are spaced apart a distance (W) about equal to a lateral distance separating wheels of an equipment vehicle.

8. The generator of claim 7 in which (A) of each sub-assembly includes ramp and cover means connected to said main frame means whereby at least two of said wheels of said vehicle can be supported atop said first and second sub-assemblies to enhance coupling of said generator to said earth.

9. The generator of claim 8 in which all of said wheels of said vehicle, are free-wheeling when said at least two wheels are atop said first and second sub-assemblies.

10. The generator of claim 2 in which said electrical signal indicating circuit means of (B) includes a source of electrical energy, said series of visual indicators to be activated in association with selected movement of said hammer element of each sub-assembly of (A), and a switching array selectively interconnected between said source and said series of indicators to provide selective connection therebetween, whereby visual status signals of operations of said generator are provided.

11. A method of positioning and generating shear wave energy for use on connection with a seismic exploration system, comprising:
    (a) positioning wheels of a transportation vehicle atop first and second guillotinized sub-assemblies of a shear wave generator, to couple the generator to the earth's surface;
    (b) hydraulically causing travel of a spring biasable hammer element of one of said sub-assemblies in a first monitorable, substantially horizontal direction;
    (c) after monitoring the releasably securing of said spring biased hammer elements relative to said frame, releasing said hammer element relative to said frame, so that said hammer element is carried in rapid travel in a second direction opposite to said first direction, until impinging contact with an anvil element carried in said main frame occurs, whereby shear waves are caused to propagate in said earth substantially parallel to the earth's surface, said monitoring of operations of steps (b) and (c) occuring by the sequential activation of a series of visual indicators of a common controller attached to said sub-assemblies whereby both status of energy generation and improved safety of operations can be provided; and repeating steps (b) and (c) using the other of said sub-assemblies but in which spring biasing and release directions of hammer travel, are reversed so that bi-directional shear waves are provided, in sequence, at the shear wave generator site.

* * * * *